US011390782B2

(12) United States Patent
Van Holen et al.

(10) Patent No.: US 11,390,782 B2
(45) Date of Patent: Jul. 19, 2022

(54) CATIONIC PRESSURE SENSITIVE ADHESIVE UV CURED BY MEDIUM MERCURY BULBS

(71) Applicant: HENKEL AG & CO. KGAA, Duesseldorf (DE)

(72) Inventors: Jurgen Van Holen, Ninove (BE); Thomas Roschkowski, Duesseldorf (DE)

(73) Assignee: Henkel AG & Co. KGaA, Dusseldorf (DE)

( * ) Notice: Subject to any disclaimer, the term of this patent is extended or adjusted under 35 U.S.C. 154(b) by 0 days.

(21) Appl. No.: 16/191,646

(22) Filed: Nov. 15, 2018

(65) Prior Publication Data

US 2019/0085221 A1 Mar. 21, 2019

Related U.S. Application Data

(63) Continuation of application No. PCT/EP2017/062417, filed on May 23, 2017.

(30) Foreign Application Priority Data

May 31, 2016 (EP) .................................. 16172165

(51) Int. Cl.
| | |
|---|---|
| *C09J 133/14* | (2006.01) |
| *C09J 7/38* | (2018.01) |
| *C08F 220/18* | (2006.01) |
| *C09J 11/06* | (2006.01) |
| *C09J 133/10* | (2006.01) |
| *C08K 5/45* | (2006.01) |
| *C08L 63/00* | (2006.01) |

(52) U.S. Cl.
CPC ....... *C09J 133/14* (2013.01); *C08F 220/1808* (2020.02); *C09J 7/385* (2018.01); *C09J 11/06* (2013.01); *C09J 133/10* (2013.01); *C08F 220/1804* (2020.02); *C08K 5/45* (2013.01); *C08L 63/00* (2013.01); *C09J 2203/334* (2013.01); *C09J 2301/416* (2020.08); *C09J 2433/00* (2013.01)

(58) Field of Classification Search
CPC . C09J 133/14; C09J 7/385; C09J 11/06; C09J 133/10; C09J 2203/334; C09J 2301/416; C09J 2433/00; C09J 133/00; C09J 2301/302; C08F 220/1808; C08F 220/1804; C08K 5/45; C08L 63/00
See application file for complete search history.

(56) References Cited

U.S. PATENT DOCUMENTS

| | | | | |
|---|---|---|---|---|
| 6,319,603 | B1* | 11/2001 | Komiya | C03C 25/106 |
| | | | | 385/114 |
| 8,785,517 | B2 | 7/2014 | Weikel et al. | |
| 8,796,350 | B2* | 8/2014 | Liu | C09J 137/00 |
| | | | | 522/182 |
| 9,217,099 | B2* | 12/2015 | Mahoney | C08G 59/68 |
| 9,683,145 | B2* | 6/2017 | Weikel | C09J 133/10 |
| 2001/0033988 | A1 | 10/2001 | Husemann et al. | |
| 2012/0329900 | A1 | 12/2012 | Lu et al. | |
| 2013/0196153 | A1* | 8/2013 | Weikel | C08F 224/00 |
| | | | | 428/355 EP |

FOREIGN PATENT DOCUMENTS

| | | |
|---|---|---|
| CN | 1235615 A | 11/1999 |
| CN | 1938377 A | 3/2007 |
| CN | 102659976 A | 9/2012 |
| CN | 102782072 A | 1/2013 |
| CN | 103588926 A | 2/2014 |

(Continued)

OTHER PUBLICATIONS

DJK Co., Ltd. Technical disclosure: UV curable resins (photocationic curing). [online]. Retrieved on [Jun. 14, 2022]. Internet URL<https://www.djklab.com/parts/service/pdf/hikari-cation-2.pdf>. (Year: 2022).*

(Continued)

*Primary Examiner* — Sanza L. McClendon
(74) *Attorney, Agent, or Firm* — Sun Hee Lehmann

(57) ABSTRACT

The present invention relates to an UV-curable pressure sensitive acrylic adhesive obtainable by reacting in a first step a mixture comprising: (i) at least one acrylic monomer of formula (I)

(I)

wherein $R^1$ is H or $CH_3$; and wherein $R^2$ and $R^3$ are both H or both $CH_3$; and n is an integer from 0 to 22; or mixtures thereof; and (ii) at least one monomer which comprises a pendant reactive functional group selected from cycloaliphatic epoxides, oxetanes, mono-substituted oxiranes or mixtures thereof; and in a second step reacting the obtained mixture from the first step with (iii) at least one cationic photoinitiator; and (iv) optionally further additives. An article comprising this adhesive, and a method of manufacturing the article.

9 Claims, No Drawings

(56) References Cited

FOREIGN PATENT DOCUMENTS

| | | | |
|---|---|---|---|
| CN | 104893626 | A | 9/2015 |
| EP | 2545132 | A2 | 1/2013 |
| JP | H1077331 | A | 3/1998 |
| JP | 2003020452 | A | 1/2003 |
| JP | 2003-147311 | A | 5/2003 |
| JP | 2013522394 | A | 6/2013 |
| JP | 2013170238 | A | 9/2013 |
| JP | 2014518929 | A | 8/2014 |
| JP | 2014523465 | A | 9/2014 |
| KR | 20130053397 | A | 5/2013 |
| WO | 9810002 | A1 | 3/1998 |
| WO | 02102911 | A1 | 12/2002 |
| WO | 2011112643 | A2 | 9/2011 |

OTHER PUBLICATIONS

Satas, D. "Handbook of Pressure Sensitive Adhesive Technology", van Nostrand, NY (1989).

* cited by examiner

CATIONIC PRESSURE SENSITIVE ADHESIVE UV CURED BY MEDIUM MERCURY BULBS

FIELD OF THE INVENTION

The present invention relates to UV-curable pressure sensitive acrylic adhesives (in the following referred to as HMPSAs as well) which are obtainable by reacting a specific acrylic monomer with at least one monomer which comprises a pendant reactive functional group selected from cycloaliphatic epoxides, oxetanes, mono-substituted oxiranes or mixtures in a first step and then reacting the obtained mixture with at least one cationic photoinitiator and optionally further components.

BACKGROUND OF THE INVENTION

Pressure sensitive adhesives (PSAs) are permanently tacky at room temperature and adhere to surfaces by application of light finger pressure. PSA compositions are commonly applied to various substrates, such as paper, fabric, metal, and plastic films that are then converted into a large number of different products, especially pressure sensitive adhesive tapes, medical tapes and labels. These pressure sensitive adhesive products have a broad field of application in the automobile industry, e.g., for fastening or sealing, in the pharmaceutical industry, e.g., for bandages or transdermal drug delivery systems, or in the packaging industry, e.g., for sealing, bonding or labeling.

PSAs can be formulated for application as a solvent borne or a molten adhesive. Hot melt pressure sensitive adhesives (HMPSAs) are compositions that combine the properties of hot melt adhesives with those of pressure sensitive adhesives. Hot melt adhesives are solids at room temperature, melt at elevated temperatures to be coated on a substrate, and regain their solid form on cooling. The combination of these properties provides compositions that melt at elevated temperatures and cool to form a permanently tacky solid coating that adheres on contact. A good workable HMPSA must exhibit high cohesive strength at room temperature, low shrinkage on substrates, retention of pressure sensitive properties during storage and use, and a relatively fluid viscosity at typical coating temperatures (e.g., between 80° C. and 180° C.). Although very low molecular weight polymers will yield hot melt adhesives with sufficient fluidity, the resulting adhesives lack cohesive strength. Very high molecular weight polymers give better cohesive strength, but are too viscous at the common application temperatures to be easily coatable on substrates. They must be blended with a high proportion of low molecular weight oils or resins to reduce the viscosity. The addition of low molecular weight oils or resins in turn detracts from the cohesive strength and heat resistance. To avoid these problems, polymers of moderate molecular weight have been made with various functional groups which undergo crosslinking reactions (curing) by heat or actinic radiation. In this manner, the cohesion of acrylic PSAs can be raised by means of sufficient curing.

Acrylic polymers are widely used in the field of PSA, because they offer great synthetic versatility in that a wide range of monomers are commercially available and the polymer architecture can already be controlled during polymerization.

For example EP 2545132 A1 discloses cationic UV-curable pressure sensitive acrylic adhesives. However, the disclosed adhesives have not been obtained by employing the specific acrylic monomer of the present invention. When the adhesives of EP 2545132 A1 are cured with medium pressure mercury lamps, which are common in the market, on a substrate, the adhesion on both sides of the adhesive is quite different. The side of the adhesive which faces the first substrate, e.g. a release liner, and thus not directly exposed to the UV light has a strongly reduced tack. Consequently, this adhesive when employed in a transfer process, i.e. the first substrate is removed after applying to the final substrate to be adhered, will give a product which has not enough tack on the side which was in initial contact with the first substrate. This deficiency is present as well when the adhesive is employed in a double sided tape since the tape will behave very differently, i.e., one side of the adhesive will be dry while the other will be quite tacky.

Therefore, it is an object of the present invention to provide UV-curable pressure sensitive acrylic adhesives which after curing have similar tack and properties on both sides of the final adhesive even though one side is stronger exposed to UV light, while curing.

Furthermore, it has been surprisingly found that the UV-curable pressure sensitive acrylic adhesives of the present invention in comparison to common non-cationic UV-curable pressure sensitive acrylic adhesives require a lower UV dose which results in a much higher line speed and thus productivity. The performance, according to SAFT measurements, at high temperature of the adhesives of the present invention is improved as well.

Moreover, in view of solvent based or water based acrylic adhesives one of the advantages is that there is no need to remove the solvent or water and thus higher coat weights can be applied in a single step leading to less waste, higher productivity and new applications.

SUMMARY OF THE INVENTION

The inventors of the present invention have surprisingly found that such improved cationic UV-curable pressure sensitive acrylic adhesives can be obtained by employing specific acrylic monomers as defined below.

In the following the present invention is described in more detail. Each described embodiment may be combined with any other embodiment or embodiments unless explicitly stated otherwise. In particular, any feature indicated as being preferred or advantageous may be combined with any other feature or features indicated as being preferred or advantageous.

DETAILED DESCRIPTION OF THE INVENTION

In the context of the present invention, the terms used are to be construed in accordance with the following definitions, unless explicitly stated otherwise:

As used herein, the singular forms "a", "an" and "the" should be interpreted as "at least one".

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

Unless otherwise defined, all terms used in the specification, including technical and scientific terms, have the meaning as commonly understood by one of ordinary skill in the art.

The term "essentially free" within the context of this invention is to be interpreted as the respective compound is contained in the composition in an amount of less than 5 wt.-%, 4 wt.-%, 3 wt.-%, 2 wt.-%, 1.5 wt-%, 1 wt.-%, 0.75 wt.-%, 0.5 wt.-%, 0.25 wt.-%, or 0.1 wt.-%, based on the total weight of the composition, wherein the amounts are respectively more preferred in descending order. For example, 4 wt.-% is more preferred than 5 wt.-% and 3 wt.-% is more preferred than 4 wt.-%.

The present invention specifically relates to:

1. An UV-curable pressure sensitive acrylic adhesive obtainable by reacting in a first step a mixture comprising:
   (i) at least one acrylic monomer of formula (I)

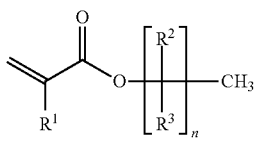

(I)

wherein $R^1$ is H or $CH_3$; and
wherein $R^2$ and $R^3$ are both H or both $CH_3$; and
n is an integer from 0 to 22;
or mixtures thereof; and
   (ii) at least one monomer which comprises a pendant reactive functional group selected from cycloaliphatic epoxides, oxetanes, mono-substituted oxiranes or mixtures thereof;
and in a second step
reacting the obtained mixture from the first step with
   (iii) at least one cationic photoinitiator; and
   (iv) optionally further additives.

2. The UV-curable pressure sensitive acrylic adhesive according to item 1, wherein (i) is present in an amount of 50 to 99.9 wt.-%, based on the total weight of the UV-curable pressure sensitive acrylic adhesive.

3. The UV-curable pressure sensitive acrylic adhesive according to item 1 or 2, wherein in formula (I)
$R^1$ is H or $CH_3$; and
$R^2$ and $R^3$ are both H or both $CH_3$; and
n is an integer from 0 to 5.

4. The UV-curable pressure sensitive acrylic adhesive according to any one of items 1 to 3, wherein monomer (ii) is present in an amount of 0.0001 to 2 wt.-%, based on the total weight of the UV-curable pressure sensitive acrylic adhesive.

5. The UV-curable pressure sensitive acrylic adhesive according to any one of items 1 to 4, wherein monomer (ii) is selected from selected from a cycloaliphatic epoxide having the formula:

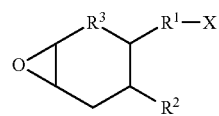

wherein
$R^1$ is O, S, C=O, or linear, branched, or cyclic alkylene, or oxyalkylene, arylene,
$R^2$ is linear, branched, and cyclic alkyl or alkoxy, aryl, H, halogen, C=O, or part of $R^1$ as fused cycloaliphatic ring through a covalent bond connection,
$R^3$ is $(CH_2)_n$, n=0 to 3,
X is acrylate or methacrylate, or comprises a —W—Y group, where
W is O, S, amide, carbonate, urethane, urea, siloxane or a combination thereof, and
Y is —$R^4$—C($R^5$)=$CH_2$, where $R^4$ is a linear or branched $C_{2\text{-}10}$ alkylene, $C_{2\text{-}10}$ oxyalkylene, C=O, or arylene or derivative thereof, and $R^5$ is H or $CH_3$, preferred monomer (ii) is selected from

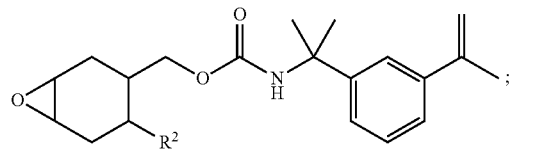

where $R^2$ = H or $CH_3$

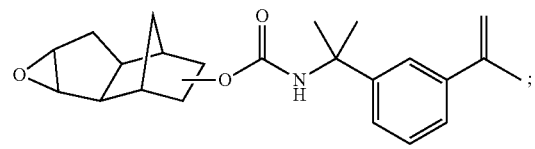

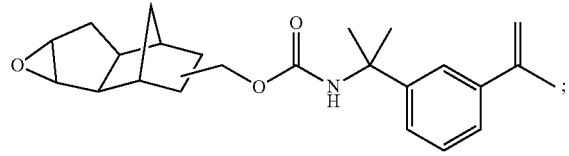

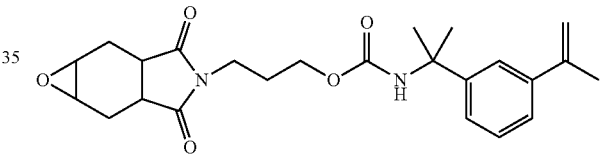

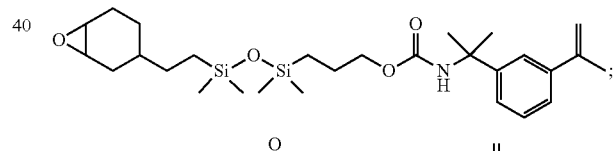

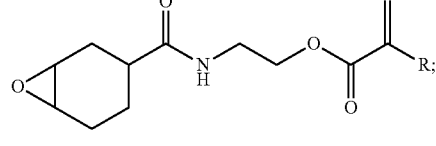

where R = H or $CH_3$

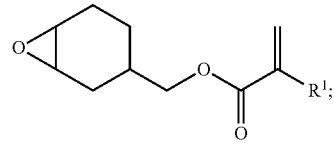

where $R^1$ = H or $CH_3$

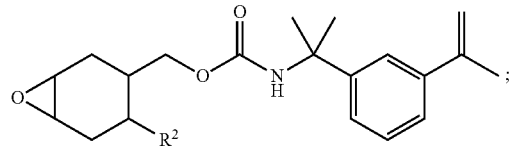

where $R^2$ = H or $CH_3$

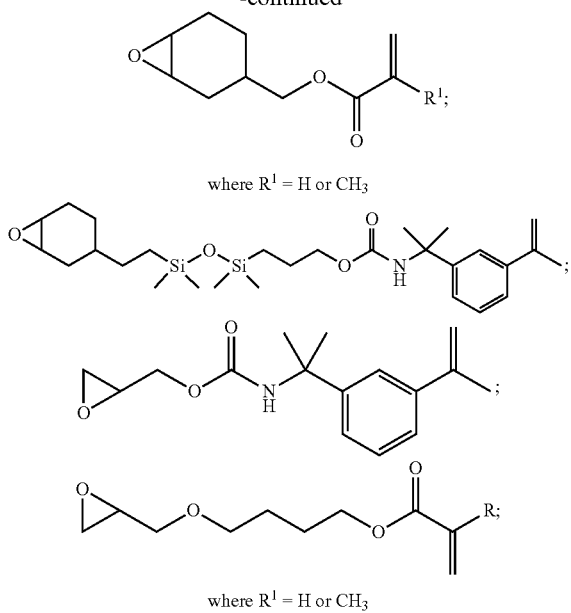

where $R^1$ = H or CH$_3$ where $R^1$ = H or CH$_3$ or mixtures thereof.

6. The UV-curable pressure sensitive acrylic adhesive according to any one of items 1 to 5, wherein the cationic photoinitiator (iii) is selected from sulfonium or iodonium salts or mixtures thereof.

7. The UV-curable pressure sensitive acrylic adhesive according to any one of items 1 to 6, wherein the cured UV-curable pressure sensitive acrylic adhesive has a relative viscosity of 1 to 3.

8. The UV-curable pressure sensitive acrylic adhesive according to any one of items 1 to 7, wherein the UV-curable pressure sensitive acrylic adhesive further comprises a tackifier.

9. The UV-curable pressure sensitive acrylic adhesive according to any one of items 1 to 8, wherein the cured UV-curable pressure sensitive acrylic adhesive has a Tg of −50° C. to 25° C.

10. An article comprising a cured UV-curable pressure sensitive adhesive according to any of items 1 to 9 and a substrate, wherein the article is preferably a tape, a medical tape, a free film between two release liner, an adhesive transfer film, a decorative or protective film, a decal or a label.

11. The article according to item 10, wherein the substrate is made of plastics, such as polypropylene, polyester; glass; nonwoven; or metal.

12. The article according to item 10 or 11, wherein the cured UV-curable pressure sensitive adhesive is a layer having a thickness of 10 μm to 500 μm.

13. Method of manufacturing an article according to any one of items 10 to 12, comprising the steps:
  (i) applying the UV-curable pressure sensitive acrylic adhesive according to any one of claims 1 to 9 onto a substrate;
  (ii) UV-curing the UV-curable pressure sensitive acrylic adhesive.

14. The method according to item 13, wherein the UV curing dose is 0.2 to 20 mJ/cm^2, preferably 1.0 to 10 mJ/cm^2, preferably the UV curing is UV-C curing, more preferred is that the lamp used for the curing is a medium pressure mercury lamp.

15. Use of the cured UV-curable pressure sensitive adhesive according to any of items 1 to 9 as a fixation, bonding, sealing, labeling, or drug delivery means.

The choice and relative amounts of the specific monomers (i) and (ii) making up the acrylic polymers used in preparing the adhesives of this invention depend upon the desired final properties and contemplated end uses of the adhesives. The choices which monomers (i) and (ii) to be used and their relative amounts in the final composition to achieve the desired properties are within the expertise of those skilled in the art.

For the polymerization process of the invention the monomers of components (i) and (ii) are converted by radical polymerization into acrylic polymers. In polymerization, the monomers are chosen such that the resulting polymers can be used to prepare adhesives, especially such that the resulting polymers possess pressure sensitive adhesive properties in accordance with the "Handbook of Pressure Sensitive Adhesive Technology" by Donatas Satas (van Nostrand, N.Y. 1989).

The exemplary acrylic monomer mixture of the first step has preferably a Tg value of less than 25° C., more preferably less than 10° C. and a weight average molecular weight from about 10,000 to about 2,000,000 g/mol more preferably between 50,000 and 1,000,000 g/mol and most preferably between 100,000 and 700,000 g/mol. The weight average molecular weight is measured via GPC employing polystyrene standards.

Suitable monomers (ii), which are capable of undergoing cationic UV-activated crosslinking reaction and providing green strength to the adhesive films, include cycloaliphatic epoxide monomers, like 3,4-epoxcyclohexyl (meth)acrylate (e.g. commercially available as M100 and A400 from Daicel), dicyclopentadienyl methacrylate epoxide (e.g., commercially available as CD535, from Sartomer Co., PA), or 4-vinyl-1-cyclohexene-1,2-epoxide (commercially available from Dow), oxetane monomers like (3-ethyl-3-oxetanyl) methyl acrylate, (e.g., commercially available as OXE-10 from Kowa Company) and (3-ethyloxetane-3-yl)methyl methacrylate (e.g., commercially available as OXE-30 from Kowa Company).

Further exemplary monomers (ii) include vinyl or acrylic compounds containing cationic UV-reactive functional croups with the formula (1):

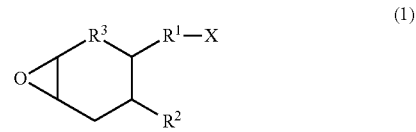

(1)

where
$R^1$ is —O—, —S—, C=O, or linear, branched, or cyclic alkylene, oxyalkylene, or arylene, $R^2$ is linear, branched, or cyclic alkyl, or alkoxy, aryl, H, halogen, C=O, or part of $R^1$ as fused cycloaliphatic ring through a covalent bond connection,
$R^3$ is (CH$_2$)$_n$, n=0-3,
X is acrylate, methacrylate or comprises a —W—Y group, where
W is —O—, —S—, amide, carbonate, urethane, urea, siloxane or a combination thereof, and
Y is —R$^4$—C(R$^5$)=CH$_2$, where R$^4$ is a linear or branched C$_{2-10}$ alkylene or C$_{2-10}$ oxyalkylene, arylene, or derivatives thereof, and R$^5$ is H or CH$_3$.

A preferred vinyl or acrylic compound for use as monomer (ii) is represented by the structural formula (1A):

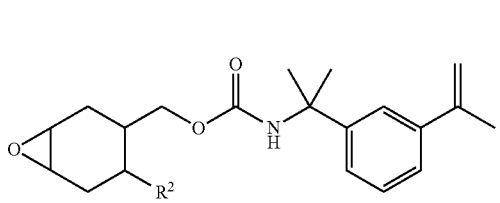

(1A)

where $R^2$=H or $CH_3$,

Another preferred vinyl or acrylic compound for use as monomer (ii) is represented by the structural formula (1B):

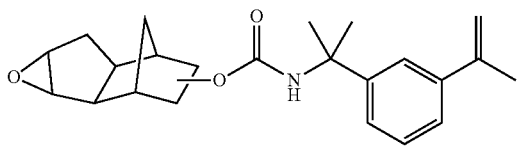

(1B)

Another preferred vinyl or acrylic compound for use as monomer (ii) is represented by the structural formula (1C):

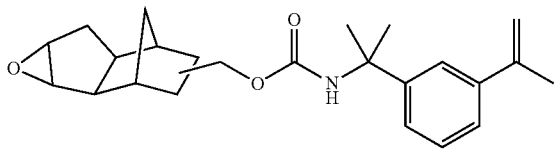

(1C)

Yet another preferred vinyl or acrylic compound for use as monomer (ii) is represented by the structural formula (1D):

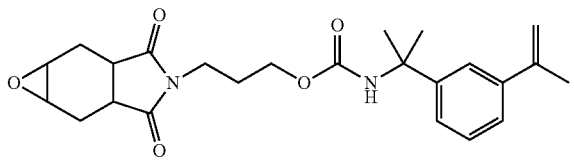

(1D)

Yet another preferred vinyl or acrylic compound for use as monomer (ii) is represented by the structural formula (1E):

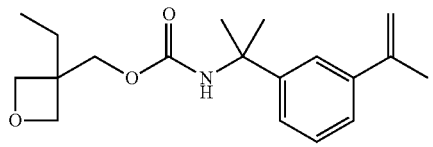

(1E)

Yet another preferred vinyl or acrylic compound for use as monomer (ii) is represented by the structural formula (1F):

(1F)

Yet another preferred vinyl or acrylic compound for use as monomer (ii) is represented by the structural formula (1G):

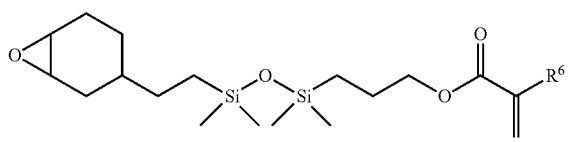

(1G)

where $R^6$=H or $CH_3$.

Yet another preferred vinyl or acrylic compound for use as monomer (ii) is represented by the structural formula (1H):

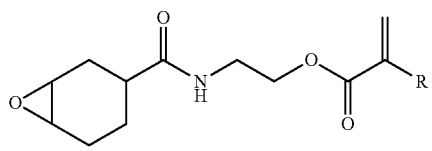

(1H)

where R=H or $CH_3$.

In a preferred embodiment the amount of the monomer (ii) is of about 0.001 to about 0.015 equivalent per 100 g of the acrylic polymer. Preferably, the acrylic polymer is essentially free of acrylates having two or more acrylate end-groups in their chain, like hexanediol diacrylate, polyol or OH-functional groups and the polymer remains substantially linear after polymerization. In a more preferred embodiment, the amount of the monomer (ii) is from about 0.002 to about 0.01 equivalent per 100 g of the acrylic polymer.

The present invention requires at least one cationic photoinitiator. The primary function of a photoinitiator is to initiate crosslinking reaction when the photoinitiator is irradiated with UV radiation. The UV curing dose is preferably 0.20 to 20 mJ/cm^2, more preferably 1 to 10 mJ/cm^2. The UV curing is preferably done via UV-C curing which according to this invention is a UV lamp which emits at least 2% in the UV-C spectrum, i.e., below 280 nm.

The most frequently used cationic photoinitiators are either organic iodonium or sulfonium salts. The mechanism of a cationic photoinitiator, when irradiated, is that it forms an excited state which then breaks down to release a radical cation. This radical cation reacts with the solvent, or other hydrogen atom donors, and generates a protonic acid, which is the active species that initiates the crosslinking reaction.

Any of the many compounds known to initiate polymerization by a cationic mechanism may be used for the crosslinking reaction in this invention. These include, for example, diaryliodonium salts, triarylsulfonium salts, dialkylphenylsulfonium salts, dialkyl(hydroxydialkylphenyl) sulfonium salts and ferrocenium salts. The anions in theses salts generally possess low nucleophilic character and include $SbF_6^-$, $PF_6^-$, $AsF_6^-$, $BF_4^-$, $B(C_6F_5)_4^-$ or Ga$(C_6F_5)_4^-$. Commercially available examples include Cyracure UVI-6976 (Dow Chemical). Particularly useful cationic initiators are soluble and red-shifted sulfonium salt photoinitiators, which have increased solubility in UV-crosslinkable compositions, promote efficient thick film UV curing, and exhibit increased thermal stability in UV crosslinkable compositions before cure, exhibit increased curing rates, and have a reduced dark cure time. Preferred cationic photoinitiators are having the structural formula (6A) and (7A):

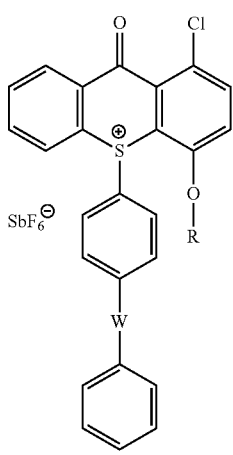

(6A)

where R is $C_3H_7$, $C_{12}H_{25}$, W is S, SO, $SO_2$ or CO.

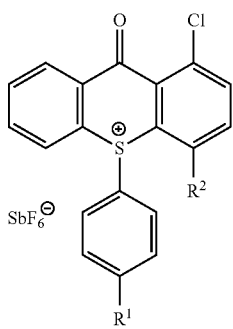

(7A)

where $R^1$ and $R^2$ are independently selected from H, $CH_3$, $C_2H_5$, $C_3H_7$, $C_{12}H_{25}$, $OCH_3$, $OC_2H_5$, $OC_3H_7$, or $OC_{12}H_{25}$.

The adhesive may also comprise various other additives, such as plasticizers, tackifiers, plasticizers, antioxidants and fillers, all of which are conventionally used in the preparation of PSAs. As tackifier or tackifying resins to be added, it is possible to use any known tackifying resins described in the literature.

Non-limiting examples of tackifiers include pinene resins, indene resins, and their disproportionated, hydrogenated, polymerized, and esterified derivatives and salts, the aliphatic and aromatic hydrocarbon resins, terpene resins, terpene-phenolic resins, C5 resins, C9 resins, and other hydrocarbon resins. Any desired combinations of these or other resins may be used in order to adjust the properties of the resultant adhesive in accordance with the desired final properties.

In general, it is possible to use any resin which is compatible with the corresponding acrylic polymers; reference may be made in particular to all aliphatic, aromatic, alkylaromatic hydrocarbon resins, hydrocarbon resins based on hydrocarbon resins, hydrogenated hydrocarbon resins, functional hydrocarbon resins, and natural resins. Explicit reference may be made to the depiction of the state of the art in the "Handbook of Pressure Sensitive Adhesive Technology" by Donatas Satas (van Nostrand, 1989).

In a further advantageous embodiment, one or more plasticizers, such as low molecular weight acrylic polymers, phthalates, benzoates, adipates, or plasticizer resins, are added to the acrylic HMPSAs. The HMPSAs may further be blended with one or more additives such as aging inhibitors, antioxidants, light stabilizers, compounding agents, and/or accelerators. The adhesive may further be mixed with one or more fillers such as fibers, carbon black, zinc oxide, titanium dioxide, solid or hollow glass microbeads, microbeads of other materials, silica, silicates, and chalk.

For the inventive process it may further be of advantage to add compounds to the acrylic PSAs that facilitate subsequent crosslinking. For this purpose the copolymers may optionally be blended with crosslinkers. Examples of suitable crosslinkers are functional acrylates. Preferred substances in accordance with the inventive process in which crosslinking occurs under radiation are, for example, difunctional or trifunctional acrylates, difunctional or polyfunctional urethane acrylates, difunctional or trifunctional multi-functional acrylic epoxy resins such as Lumicryl 1000 and 1100 (Estron Chemical). It is, however, also possible here to use any further difunctional or polyfunctional compounds which are familiar to the skilled worker and are capable of crosslinking acrylic polymers. For optional thermal or moisture crosslinking it is possible to use blocked difunctional or polyfunctional isocyanates, (meth)acrylates or other functional groups.

One further development that makes the process of the invention particularly advantageous for the production of hot melt PSAs is that all additives are either blended to the molten, solvent-free acrylic polymers, or more efficiently, added into the solutions of the copolymers at the end of the polymerization reactions. Upon the removal of the solvent, the mixtures are concentrated to give hot melt PSAs.

As known by those skilled in the art, the preparation of acrylic polymers can be carried out by solution, emulsion, or bulk polymerization procedures using well-known polymerization techniques, such as free radical techniques. The copolymers can then be formed into hot melt adhesives by removal of the solvent, coagulation of the latex, or melt-processing of the neat polymers.

The polymerization may be conducted in the presence of one or more organic solvents and/or in the presence of water. Suitable organic solvents or mixtures of solvents are alkanes, such as hexane, heptane, octane, isooctane, and cyclohexane; aromatic hydrocarbons, such as benzene, toluene, and xylene; esters, such as ethyl, propyl, butyl and heptyl acetate; halogenated hydrocarbons, such as chlorobenzene; alkanols, such as methanol, ethanol, iso-propanol, ethylene glycol, and ethylene glycol monomethyl ether; ethers, such as diethyl ether and dibutyl ether; or mixtures thereof.

In a preferred embodiment of the process, the first step proceeds in an organic solvent, preferably ethyl acetate, thermally initiated by a radical initiator, preferably azobisisobutyronitrile (AIBN).

The HMPSAs prepared will generally have a weight averaged average molecular weight (Mw) of from 10,000 to 2,000,000 g/mol, more preferably between 50,000 and 1,000,000 g/mol and most preferably between 100,000 and 700,000 g/mol. The Mw is determined by gel permeation chromatography (GPC) employing polystyrene standards or matrix-assisted laser desorption/ionization mass spectrometry (MALDI-MS).

The adhesives can be formulated as a solvent borne adhesive and used by coating films or paper with polymer solutions or suspensions and subsequently removing the solvent by drying.

To be used as HMPSAs, the acrylic polymers should be essentially free of the solvent. For this purpose the copolymers prepared as described above are concentrated to a solvent content of less than 2% by weight, preferably less than 0.2% by weight. This process takes place preferably in a reaction tank, or vacuum mixer, concentration extruder, such as vent extruder, ring extruder, single-screw extruder, or twin-screw extruder, which are known to the skilled worker.

Application of the HMPSAs may be accomplished using any conventional means, such as roller, slot orifice, spray, or extrusion coating. Non-limiting examples of substrate are films, tapes, sheets, panels, foam, and the like; and can be made of materials such as paper, fabric, plastic (polyesters, PE, PP, BOPP, and PVC), nonwoven, metal, foil, glass, natural rubber, synthetic rubber, wood, or plywood. If a coated substrate is to be used in the form of a self-wound roll, the back of the substrate is usually coated with a release coating to prevent the adhesive from adhering to the reverse side of the substrate. If a substrate is to be coated with the adhesive on both sides and rolled, a strippable paper or other protective means is laid over the adhesive on one side to prevent that adhesive from adhering to the adhesives on the other. In some uses, a second substrate may be applied directly to the adhesive.

In most pressure sensitive adhesive uses, a hot melt adhesive is applied to a backing or substrate before crosslinking. The adhesive is formulated preferably to provide a composition that can be heated to render a coatable fluid on the substrate. Commonly used industrial coating temperatures are in the range of 80 to 180° C. Typically, the hot melt PSAs of this invention have melt viscosities preferably between 1000 to 500,000 mPa·s, more preferably between 5000 to 100,000 mPa·s at those application temperatures, preferably 150° C. Viscosity measurements can be performed by using a Brookfield DV-1 Viscometer at the defined temperature. A sample of 10 g was used with a spindle No 27 at a speed setting of 4 rpm.

In a preferred embodiment the HMPSAs have a relative viscosity of 1 to 3, more preferred 1.5 to 2.5. The relative viscosity can be determined according to ASTM D 2857-95(2007).

A pressure sensitive adhesive film may be formed by applying the hot melt to a release liner, such as silicone coated paper or plastic film, and then after irradiation, the adhesive may be stripped from the release liner and used as a film. Alternatively, the adhesive can be coated onto a release liner, laminated and transferred to a substrate.

The hot melt PSAs of the invention can be crosslinked in air by irradiation with UV light in the range from 200 to 500 nm. Irradiation may be done immediately while the adhesive compositions are still in a melt form, or after they have been cooled to room temperature.

Adhesive composition is irradiated for a period of time sufficient to transform the low cohesion composition into a viscoelastic adhesive of higher modulus. The exact length of the exposure is dependent upon the nature and intensity of the radiation, the amount of cationic photoinitiator, the polymer composition, adhesive formulation, the thickness of the adhesive film, environmental factors, and the distance between the radiation source and the adhesive film. The dosage or the length of exposure is conveniently controlled by the belt speed. It may be appropriate to adapt the lamp output to the belt speed or to shade off the belt partly, in order to reduce its thermal load.

Actinic light from any source may be used on the adhesive, provided the source furnishes an effective amount of UV radiation. Suitable sources of radiation are carbon arcs, mercury-vapor arcs, fluorescent lamps with special ultraviolet light emitting phosphors, electronic flash lamps and the like, lasers of specific wavelengths, UV LED, or combinations of those. Preferred lamps are the electrodeless microwave powered lamps from Fusion Systems, or commercially customary high or medium pressure mercury lamps with an output of, for example, from 80 to 240 W/cm. Preferred are medium pressure mercury lamps with an output of from 120 to 240 W/cm. The adhesive compositions of the invention generally exhibit their maximum sensitivity to wavelengths in the ultraviolet range.

In addition, the acrylic hot melt PSAs described in accordance with the invention may be crosslinked with electron beams. This type of crosslinking can also take place in addition to the UV crosslinking.

The adhesives of the present invention may be used to bond one substrate to a second substrate. Substrates include but are not limited to plastic, glass or plastic-coated glass, wood, metal, etc. The adhesive may be applied by a variety of methods including coating or spraying in an amount sufficient to cause the substrates to be bonded together to adhere. The adhesive coated substrate may be irradiated before or after bonding. Since cure begins immediately upon irradiation, but may not be completed for several days, there is time immediately after irradiation, but before gelation for bonding to take place.

The pressure sensitive adhesives of the invention may advantageously be used in the manufacture of adhesive articles including, but not limited to, industrial tapes and transfer films. Single and double face tapes, as well as supported and unsupported free films are encompassed by the invention. In one embodiment, the adhesive article comprises an adhesive coated on at least one major surface of a backing having a first and second major surface. Useful backing substrates include, but are not limited to foam, metal, paper, fabric, and various polymers such as polypropylene, polyamide, polyester, polyethylene terephthalate, and mixtures thereof. The adhesive may be present on one or both surfaces of the backing. When the adhesive is coated on both surfaces of the backing, the adhesive coatings can be the same or different.

EXAMPLES

Preparation of Adhesive Coatings

A lab coater with two heatable rolls was used to apply the adhesive. The adhesive was heated to 150° C. and coated onto a 2 mil (51 μm) thick silicone-coated PET release liner. The adhesive on the liner was irradiated at a line speed of 15 meters per minutes under H-bulb (Fusion Systems) with a dosage of UV-C 257 mJ/cm2. The film was then laminated and transferred to a polyethylene terephthalate substrate (Mylar®, DuPont) and conditioned at 23° C. and 50% relative humidity. Unless otherwise indicated, the adhesive film thickness was 3.5 mil (89 μm).

UV Cure

Adhesive films were cured using medium pressure mercury arc lamps (using an IST UV curing laboratory unit).

The UV C dose was measured and recorded using an EIT Power Puck. UV-C is the region between 200 and 280 nm.

Measurement Methods:

AFERA 4001 (adhesion (peel) measurement according to DIN EN ISO 11339:2010-06) AFERA 4012 (cohesion (shear) measurement according to ASTM D3654/D3654M-06(2011), D 6364 or PSTC-107)

Peel Adhesion

Adhesives were cast in a range of coating weights (from 20 to 100 g/m2) film onto a silicone liner using a Chemsultants® hot melt laminator coater then cured (as noted above). The cured free film was transferred to 50 μm PET backing film.

Peel adhesion was measured as the force required to remove a pressure sensitive tape from a standard stainless steel panel at a specified angle and speed according to FINAT Test Method no. 1 adapted as follows. Equipment used to measure this value included a standard FINAT 2 kg rubber-covered roller, and a standard Instron® tensile testing machine.

A stainless steel panel (AFERA steel from Rocholl GmbH) was cleaned as per standard FINAT method. Before the stainless steel panel was used it was abraded along the length of the test panel with a 400-grit waterproof wet and dry sanding paper under the tap, until water flowed smoothly over the steel plate. After this it was rinsed with water and dried, cleaned with ethyl acetate, and conditioned in a controlled climate room maintained at 23° C. and 50% relative humidity (RH), for at least 1 hour.

The coating to be tested was conditioned for 24 hours at 23° C.+2° C. and 50%+5% RH. Test strips were cut to 25 mm×175 mm.

The backing paper was removed from each strip and placed, adhesive side down, onto a clean test plate using light finger pressure, and then rolled twice in each direction with the standard 2 kg FINAT test roller, at a speed of approximately 10 mm per second. After applying the strips to the test plate at a rate of one per 2 minutes the strips were left until the first test piece had either 20 minutes or 24 hours elapsed time (dwell).

The tensile tester was set with a crosshead speed of 300 mm/minute. The free end of the tape was doubled back at an angle of 180° and clamped to the upper jaw of the machine. The end of the panel was clamped to the lower jaw. The test strip was then peeled from the panel and the peel force was recorded in Newtons/25 mm width of tape.

The results obtained for adhesive mode failure were classified as Adhesion Failure (test piece separated from test plate without leaving any residue) or Cohesive Failure (adhesive film split cohesively and residue left on test piece and test plate).

Loop Tack FTM 9 (25° C. on glass) Loop Tack was measured according to Test Method B, PSTC-16, adapted as follows. A loop tack tester was used for the measurement. All test samples of the acrylic polymers were UV-irradiated according to the procedure described above. The adhesive was coated on 50 μm PET film backing and the size of a specimen strip was 125 mm×24 mm.

Shear Adhesion Failure Temperature (SAFT) was measured according to ASTM D4498-07(2015). Three samples, 25 mm×100 mm in dimensions, were cut from each cured sample in the machine coating direction. SAFT panels (mirrored Steel) were cleaned with ethyl acetate. Samples were adhered to the steel panel overlapping up to an engraved line so that a square 25×25 mm of adhesive was in contact with the test panel. The test area was rubbed using a straight edged wooden applicator to ensure good contact between the panel and test sample. Samples were placed into the test oven at room temperature. The heating program was started and 1 kg shear load applied when the temperature reached 40° C. The oven temperature was ramped at 0.5° C./minute up to 200° C. and the failure temperature (SAFT) was recorded.

Rolling ball was measured according to ASTM D3121-94(1999).

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

Example 1 (Comparative): Standard Example Using an Acrylic Polymer Containing 2-Ethylhexylacrylate Preparation of the UV Curable Polymer:

A four-neck 1 L round-bottom polymerization flask was equipped with a thermometer connected to a temperature control device, a condenser, an overhead mechanical stirrer, two addition funnels, and nitrogen inlet/outlet. The set-up was purged with nitrogen gas for 15 min. A mixture of the following monomers was prepared: 2-ethylhexylacrylate (2-EHA, 99.8 g), methyl acrylate (MA, 96.2 g), 1-acrylomethyl-3,4-cyclohexene epoxide (M100, 1.0 g). To one of the funnels was charged 160 g of the monomer mixture. To another funnel was charged the initiator 2,2'-azobis-(2-methyl propionitrile) (AIBN, 0.5 g) and ethyl acetate (60 mL). To the polymerization flask was charged the remaining monomer mix (40 g), initiator AIBN (0.27 g), and ethyl acetate (100 mL). The mixture was heated to vigorous reflux (76 to 80° C.) and held for 15 minutes. Then, the monomer mix in the funnel was added continuously over 2 hr at a constant rate. Simultaneously, the initiator solution in the funnel was added continuously over 3 hr at a constant rate. Upon complete addition of initiator solution, the mixture was stirred for an additional 2 hr at reflux. A short half-life initiator (0.75 g) and ethyl acetate (25 mL) were charged into the initiator funnel and then added into the polymerization flask over 1 hr to reduce residual monomers. The polymerization solution was cooled to 60° C. and cationic photoinitiator Omnicat 320 (1.0 g, 50% in propylene carbonate) was added and mixed thoroughly for 15 minutes. After ethyl acetate was removed by under vacuum at 55-60.degree. C., acrylic polymer (I) was obtained with Mw of approximately 97,000 determined by GPC. The viscosity (Brookfield) of the polymer was about 40,000 mPas at 135° C.

As can be read from table 1 below, the performance between the two sides is quite different 10 and 5 for the Afera 4012 test and 23 versus 52 for the rolling ball test. Also under different curing conditions the difference in performance between the two sides is substantial, demonstrating that the issue cannot be solved by adapting the UV dose.

TABLE 1

Performance measurements of a tackified UV curing adhesive containing 2-ethylhexyl acrylate

| Coating method | unit | direct | direct | transfer | transfer |
|---|---|---|---|---|---|
| Coating weight: 65 g/m² | | | | | |
| Applied Dose (mJ UV-C/cm²) | | 25 | 40 | 25 | 40 |
| Measured side | | Coating condition 1: light side | Coating condition 2: light side | Coating condition 1: dark side | Coating condition 2: dark side |
| AFERA 4001 after 10 min. on steel | N/inch | 10.7 AF | 12.5 AF | 11.1 AF | 11.7 AF |
| AFERA 4001 after 24 h on steel | N/inch | 12.6 AF | 13.6 AF | 15.3 AF | 14.8 AF |
| AFERA 4001 after 24 h on HDPE | N/inch | 5.2 AF | 6.4 AF | 6.7 AF | 6.9 AF |
| Loop Tack FTM 9 (RT) Glass | N/inch | 11.4 AF | 12.8 AF | 11.2 AF | 11.7 AF |
| AFERA 4012 at 70° C. steel | N | 10 | 10 | 5 | 5 |
| SAFT | ° C. | >180 | >180 | >180 | >180 |
| rolling ball | cm | 23 | 22 | 52 | 35 |

Example 2: Example Using Only Butyl and Methyl Acrylate in the Acrylic Polymer

Preparation of the UV curable polymer: identical to the polymer prepared in example 1, with the difference that the 2-ethylhexyl acrylate was replaced with butyl acrylate. The performance of this polymer can be seen in table 2 below. Most important are the rolling ball values for the 2 different curing conditions: AT 20 mJ UV-C: 20 and 21 cm for the both sides. At the higher curing dose: 26 and 28 cm, which is not a significant difference.

TABLE 2

Performance measurements of the tackified polymer using only butyl and methyl acrylate

| Coating method | unit | direct | direct | transfer | transfer |
|---|---|---|---|---|---|
| Coating weight: 65 g/m² | | 65 gsm | 65 gsm | 65 gsm | 65 gsm |
| Applied Dose (mJ UV-C/cm²) | | 20 mJ/cm2 | 40 mJ/cm2 | 20 mJ/cm2 | 40 mJ/cm2 |
| Measured side | | Coating condition 1: light side | Coating condition 2: light side | Coating condition 1: dark side | Coating condition 2: dark side |
| AFERA 4001 after 10 min. on steel | N/inch | 9.6 AF | 9.6 AF | 11.5 AF/CF | 11.5 AF/CF |
| AFERA 4001 after 24 h on steel | N/inch | 13.4 AF | 12.6 AF | 15.2 CF | 15.1 CF/AF |
| AFERA 4001 after 24 h on HDPE | N/inch | 6.6 AF | 6.3 AF | 7.3 AF | 7.3 AF |
| Loop Tack FTM 9 (RT) Glas | N/inch | 11.1 AF | 11.6 AF | 12.7 AF | 13.3 AF |
| AFERA 4012 at 23° C. steel | N | 20 | 20 | 20 | 20 |
| SAFT | ° C. | >180 | >180 | >180 | >180 |
| rolling ball | cm | 20 | 26 | 21 | 28 |

The invention claimed is:

1. A method of manufacturing an article comprising the steps:
   (i) applying a UV-curable pressure sensitive acrylic adhesive onto a substrate;

wherein the UV-curable pressure sensitive acrylic adhesive is obtainable by reacting
   in a first step a mixture consisting of:
   (a) at least one acrylic monomer of formula (I)

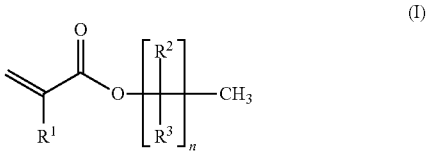

wherein $R^1$ is H or CH3; and
   wherein $R^2$ and $R^3$ are both H; and n is an integer from 0 to 22;
   or mixtures thereof; and
   (b) at least one monomer which comprises a pendant reactive functional group selected from cycloaliphatic epoxides, oxetanes, mono-substituted oxiranes or mixtures thereof;
   and in a second step reacting the obtained mixture from the first step with
   (c) at least one cationic photoinitiator; and
   (d) at least one tackifier; and
   (ii) UV-curing the UV-curable pressure sensitive acrylic adhesive at a UV-C curing dose of 0.2 to 20 mJ/cm^2 whereby forming a UV-cured pressure sensitive acrylic adhesive.

2. The method of manufacturing the article according to claim 1, wherein [(a)] is present in an amount of 50 to 99.9 wt.-%, based on the total weight of the UV-curable pressure sensitive acrylic adhesive.

3. The method of manufacturing the article according to claim 1, wherein in formula (I) n is an integer from 0 to 5.

4. The method of manufacturing the article according to claim 1, wherein monomer (b) is selected from a cycloaliphatic epoxide having the formula:

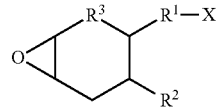

wherein
$R^1$ is O, S, C=O, or linear, branched, or cyclic alkylene, or oxyalkylene, arylene,
$R^2$ is linear, branched, and cyclic alkyl or alkoxy, aryl, H, halogen, C=O, or part of $R^1$ as fused cycloaliphatic ring through a covalent bond connection,
$R^3$ is (CH2)n, n=0 to 3,
X is acrylate or methacrylate, or comprises a —W—Y group, where
W is O, S, amide, carbonate, urethane, urea, siloxane or a combination thereof, and
Y is —$R^4$—C($R^5$)=CH2, where $R^4$ is a linear or branched C2-10 alkylene, C2-10 oxyalkylene, C=O, or arylene or derivative thereof, and $R^5$ is H or CH3.

5. The method of manufacturing the article according to claim 1, wherein the cationic photoinitiator (c) is selected from sulfonium or iodonium salts or mixtures thereof.

6. The method of manufacturing the article according to claim 1, wherein the cured UV-curable pressure sensitive acrylic adhesive has a relative viscosity of 1 to 3.

7. The method of manufacturing the article according to claim 1, wherein the cured UV-curable pressure sensitive acrylic adhesive has a Tg of −50° C. to 25° C.

8. The method of manufacturing the article according to claim 1, wherein the substrate is made of plastics; glass; nonwoven; or metal.

9. The method of manufacturing the article according to claim 1, wherein the cured UV-curable pressure sensitive acrylic adhesive is a layer having a thickness of 10 μm to 500 μm.

* * * * *

UNITED STATES PATENT AND TRADEMARK OFFICE
CERTIFICATE OF CORRECTION

| | |
|---|---|
| PATENT NO. | : 11,390,782 B2 |
| APPLICATION NO. | : 16/191646 |
| DATED | : July 19, 2022 |
| INVENTOR(S) | : Jurgen Van Holen and Thomas Roschkowski |

It is certified that error appears in the above-identified patent and that said Letters Patent is hereby corrected as shown below:

In the Specification

Column 6, Line 45 change "croups" to --groups--.

Signed and Sealed this
Seventh Day of February, 2023

Katherine Kelly Vidal
*Director of the United States Patent and Trademark Office*